United States Patent [19]
Gerber et al.

[11] Patent Number: 5,710,895
[45] Date of Patent: Jan. 20, 1998

[54] METHOD AND APPARATUS FOR CAPTURING AND COMPRESSING VIDEO DATA IN REAL TIME

[75] Inventors: Richard Gerber, Hillsboro; Joshua Herman, Beaverton, both of Oreg.

[73] Assignee: Intel Corporation, Santa Clara, Calif.

[21] Appl. No.: 742,261

[22] Filed: Oct. 31, 1996

Related U.S. Application Data

[63] Continuation of Ser. No. 215,918, Mar. 22, 1994, abandoned.

[51] Int. Cl.⁶ .................. G06T 1/20; G06F 3/14
[52] U.S. Cl. .................. 395/327; 395/972; 395/503; 395/504; 395/520; 348/552
[58] Field of Search .................. 395/327, 972, 395/328, 340, 806, 807, 503, 504, 520, 511, 514, 526; 348/552

[56] References Cited

U.S. PATENT DOCUMENTS

| | | | |
|---|---|---|---|
| 4,698,770 | 10/1987 | Rattan et al. | 395/892 |
| 5,191,645 | 3/1993 | Carlucci et al. | 395/328 |
| 5,208,745 | 5/1993 | Quentin et al. | 395/806 X |
| 5,355,450 | 10/1994 | Garmon et al. | 395/501 |
| 5,471,577 | 11/1995 | Lightbody et al. | 395/340 |
| 5,502,503 | 3/1996 | Koz | 348/552 |
| 5,508,940 | 4/1996 | Rossmere et al. | 395/806 X |

OTHER PUBLICATIONS

Roberts, "Putting Pictures in PCs", Tech PC User, Apr., 7, 1989.
Leonard, "Compression Chip Handles Real–Time Video and Audio", Electronic Design, Dec. 1990.
Floyd, "Data Compression and the AVK", Dr. Dobb's Journal, Jul. 1992.
Green, "Capturing Digital Video Using DVL; Multimedia and the i750 Video Processor", Dr. Dobb's Journal, Jul. 1992.

Primary Examiner—Raymond J. Bayerl
Attorney, Agent, or Firm—Blakely, Sokoloff, Taylor & Zafman

[57] ABSTRACT

Operating in cooperation with a shared software interface, a driver controls the operations of a video hardware device that captures and compresses video data in real time. This driver controls capture and compression of the video data in response to a capture message call through control of a handshaking scheme between a host processor within the computer system and an auxiliary processor located in a video hardware device.

15 Claims, 6 Drawing Sheets

METHOD AND APPARATUS FOR CAPTURING AND COMPRESSING VIDEO DATA IN REAL TIME

This is a continuation of Application Ser. No. 08/215,918, filed Mar. 22, 1994, now abandoned.

BACKGROUND OF THE INVENTION

1. Field of the Invention

The present invention relates to a method and apparatus for capturing and compressing video data. More particularly, the present invention relates to a driver operating in cooperation with VIDEO FOR WINDOWS, a software interface manufactured by Microsoft® Corporation, to drive specifically configured hardware to capture and compress video data in real time.

2. Background of the Field

It is commonly known that video equipment (e.g., video camcorders, video recorders, laser disks, etc.) has enabled persons to record or "capture" video data (i.e., audio and visual data) onto storage medium such as videotape. The storage medium is commonly "played back" by the video equipment which transmits the captured video data into a cathode ray tube for viewing purposes. This captured video data is affixed to the storage medium, thereby preventing any alteration of the captured video data except, of course, by erasing it completely from the storage medium.

Due to the growing popularity of video equipment and multi-media products over the last few years, businesses have begun to realize the commercial advantages in establishing an efficient interactive relationship between video equipment and computers. Recently, Microsoft® Corporation has developed a software interface entitled VIDEO FOR WINDOWS (the "VFW interface") which enables video equipment to operate in conjunction with computers using a WINDOWS™ operating system. Thus, a software capture application using the VFW interface (hereinafter referred to as a "VFW-based capture application") generates and transmits a capture message call to the VFW interface which, in turn, is usually routed to one of a plurality of drivers, namely a capture driver operating under software control, to drive video hardware specifically configured to capture video data.

As shown in FIG. 1, operational steps undergone by the VFW-based capture application are illustrated, wherein certain VFW capture message calls associated with these operational steps are listed in Table 1 of the Appendix. Upon activation by the user, the VFW-based capture application initializes the capture driver through pre-selected initialization capture message calls (Step 101), including but not limited to those listed in Table 1. Next, format for the captured video data (i.e., capture format) is configured according to predetermined default values (Step 102). Thereafter, the VFW-based capture application performs one of four user-selected alternatives; namely, customizing the capture format (Step 104), terminating the video capture application (Step 106–107), capturing video data video frame-by-video frame (Steps 109) or capturing video data in a stream of video frames (Steps 110–112).

To customize the capture format, the VFW-based capture application generates and transmits a capture message call (e.g., a "DVM_DIALOG" message call per Table 1) to the capture driver in order to open a dialog box (Step 104). The dialog box allows user-modification of video quality, key frame rate and other custom video options.

The second alternative is to exit the VFW-based application (Step 105). This causes a message to be sent to the capture driver informing the capture driver to unload information contained therein (Step 106) and power-down the video hardware coupled to the computer system (Step 107).

The VFW-based capture application offers two more alternatives associated with capturing video data. These alternatives demonstrate two different modes of capturing video data; namely, a stream mode where multiple video frames are being captured sequentially and a frame mode where only one video frame of video data is captured at a time. A video frame has a maximum height of 240 scan lines according to NTSC standards. In step 108, the frame mode is commenced upon receipt of a frame capture message call (a "DVM_FRAME" capture message call per Table 1) and parameters included with the frame capture message call which provide the capture driver information relevant to its operations, such as storage location information (Step 109). In steps 110–112, the stream mode is commenced upon receipt of a stream capture message call (a "DVM_STREAM_INIT" capture message call per Table 1) and, similar to the frame mode, pre-selected parameters necessary to perform proper stream capture operations are transmitted therewith.

In conventional interactive video computer systems, video data is captured when the VFW-based capture application transmits a capture message call having a number of parameters through the VFW interface and into a conventional capture driver. These parameters include information necessary to properly capture video data including, but not limited to, its capture mode (i.e., frame or stream), the video frame size and a storage location for the captured video data. Upon receipt of the capture message call, the conventional capture driver initiates control signals to the specifically configured hardware to capture the video data. Thereafter, the VFW-based capture application writes the captured video data to disk. Subsequently, the same or perhaps another VFW-based application requests the captured video data to be retrieved from disk, uses a compression driver to encode (i.e., compress) the captured video data and then writes the compressed video data back to the disk. This conventional interactive video computer system has many disadvantages.

A first disadvantage associated with the conventional interactive video computer system is that video data is not captured in real-time, but rather includes extraneous steps in writing and retrieving the captured video data to and from disk. As a result, this conventional interactive video computer system experiences enormous time delays in the range of several minutes to several hours caused by these extraneous steps.

Another disadvantage is that the conventional interactive video computer system require a hard disk with a large memory space, generally hundreds of megabytes, in order to store the captured video data in uncompressed form. Due to this large memory requirement, the overall costs associated with the conventional interactive video computer systems is quite substantial, making the systems unaffordable to a large section of the public.

In an effort to overcome these disadvantages, prior to the subject application, Intel Corporation of Santa Clara, Calif. had designed and developed a driver for the VFW interface which combined capture and compression operations (hereinafter referred to as the "AVK driver"). However, the AVK driver also had many disadvantages associated therewith. One such disadvantage was that the AVK driver is extremely complex and unreliable, requiring at least fifty installation files to be installed in the interactive video computer system before functioning. Another disadvantage was that it was extremely costly to implement since it required a relatively large memory space, approximately two megabytes of main memory and two megabytes of video random access memory ("VRAM"). This large memory space was necessary to store a large number of micro-code files therein. As a result, the AVK driver was incapable of operating in real time. In fact, the AVK driver was extremely slow, requiring up to five seconds before the first picture was displayed because the loading of installation files into the interactive video system was extremely time consuming. Besides requiring a large memory space of main memory and VRAM, the AVK driver also required EMS memory space which is a scarce resource in typical microcomputers.

BRIEF SUMMARY OF THE INVENTION

In light of the foregoing, it is appreciated that a simple driver capturing and compressing data in real time and requiring minimal memory would be advantages in the marketplace by allowing any computer user to immediately capture data without purchasing additional memory or a computer system having large memory capabilities.

Therefore, present invention provides a driver under control by the VFW-based capture application to control the capture of video data transmitted into video hardware by an I/O device and to compress the video data in real time (a "capture and compression driver"). One embodiment of the present invention comprises a driver which controls video hardware including an auxiliary processor to capture and compress video data based on particular capture message calls transmitted therein by a VFW-based capture application. Such capture and compression of video data is accomplished through a handshaking scheme controlled by the driver between a host processor within the computer system and the auxiliary processor within the video hardware.

BRIEF DESCRIPTION OF THE DRAWINGS

The features and advantages of the present invention will become apparent from the following detailed description of the present invention in which.

DETAILED DESCRIPTION OF THE INVENTION

The present invention describes a driver, operating in cooperation with the VFW interface, which captures and compresses video data in real time to enhance system performance. The detailed description which follows is presented largely in terms of tables and algorithms which are the means used by those skilled in the art to most effectively convey the substance of their work to others skilled in the art. An algorithm is generally conceived to be a series of steps leading to a desired result. These steps require physical manipulations of physical quantities. Usually, although not necessary, these quantities take the form of electrical or magnetic signals capable of being stored, transferred, combined, compared or otherwise manipulated. It further should be noted that there exist some instances where well-known steps are not set forth in detail in order to avoid unnecessarily obscuring the present invention.

Figure 1:
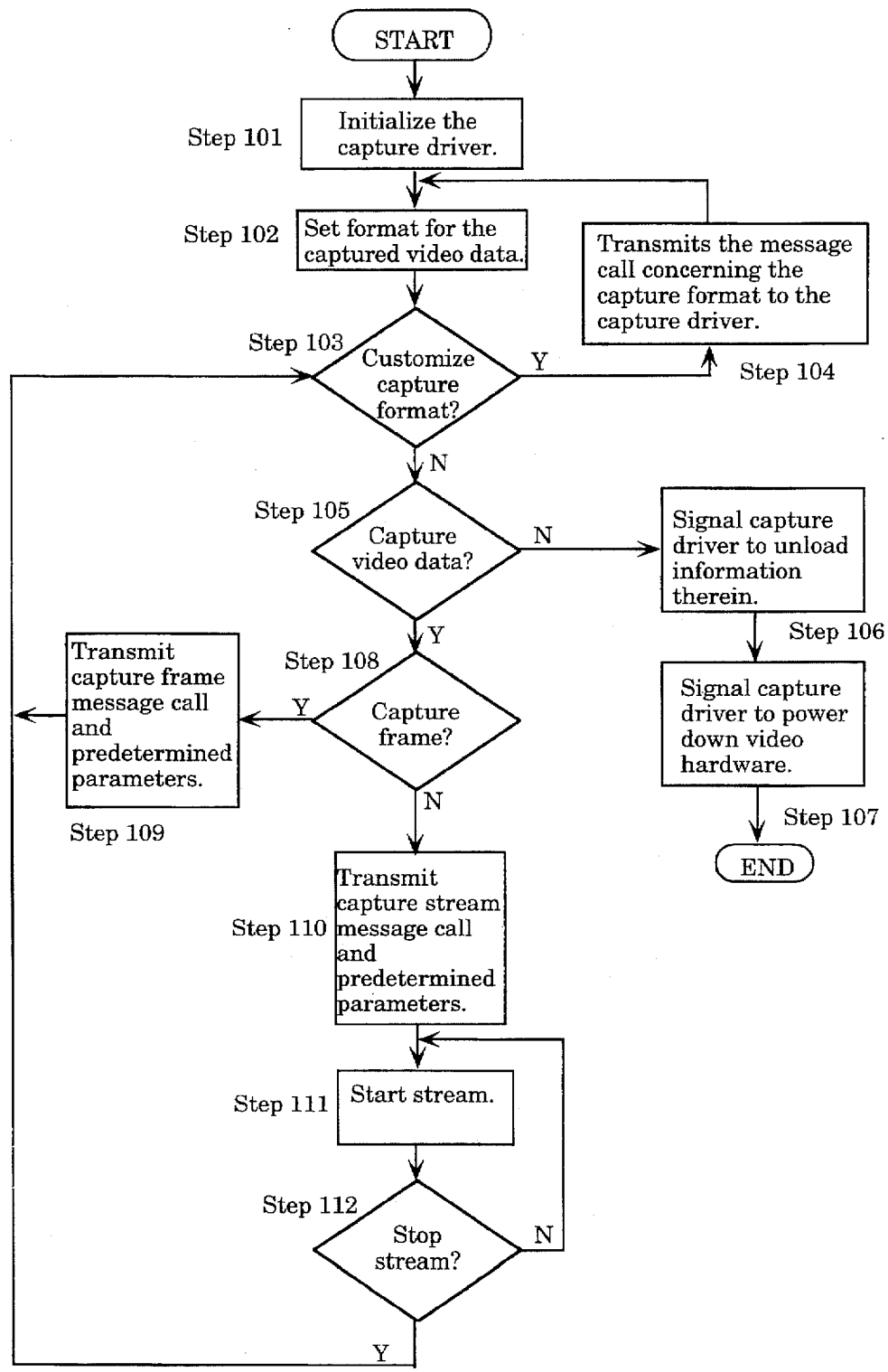
FIG. 1 is a flowchart of the operations of a VFW-based capture application.
Figure 2:
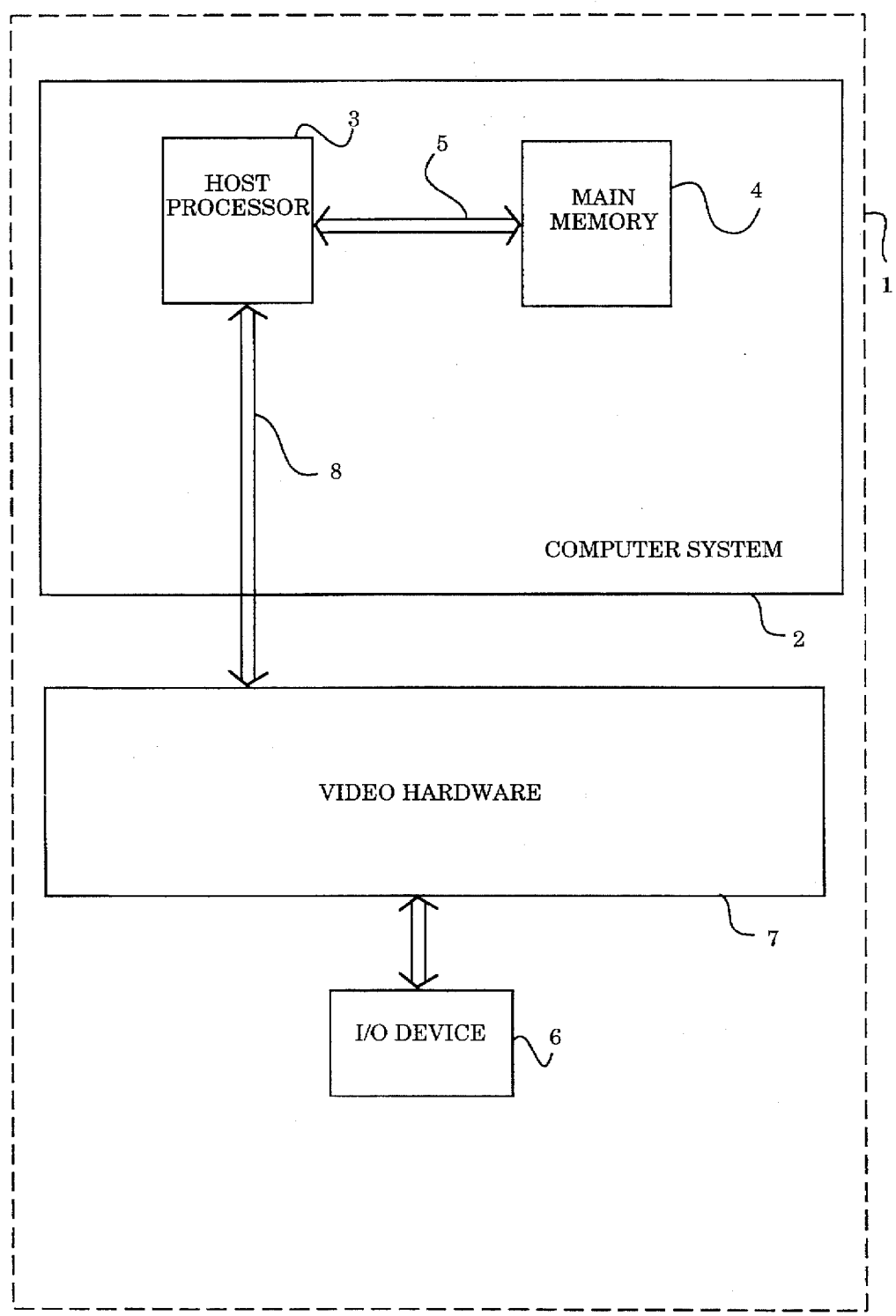
FIG. 2 is a block diagram of the interactive video computer system employing the capture and compression driver.

Referring to FIG. 2, an embodiment of an interactive video computer system 10 utilizing the present invention is illustrated in which the present invention may be best described as an ISA plug-in adapter for an IBM® compatible personal computer with an INTEL® 80X86 processor. The computer system 10 generally comprises a system bus 11 including address, data and control buses for communicating information between a plurality of bus agents, including at least a host processor 12. The host processor 12 is an Intel® 80×86-compatible processor; however, the present invention may be utilized in any type of processor. Although only the host processor 12 is illustrated in this embodiment, it is contemplated that multiple processors could be employed within the computer system 10.

As further shown in FIG. 2, the system bus 11 provides access to a memory subsystem 13, video subsystem 14 and an input/output ("I/O") subsystem 15. The memory subsystem 13 includes a memory element 16 such as a dynamic random access memory ("DRAM") 16 in FIG. 2, but such memory element may include any type of memory such as read only memory ("ROM"), static random access memory ("SRAM") and the like. The memory element 16 stores programs executed by the host processor 12 such as the VFW-based capture application. It is contemplated that a memory controller could be used as an interface between the system bus 11 and a variety of memory elements to control access thereto.

The video subsystem 14, shown coupled to the system bus 11 but may be coupled to an I/O bus 20, includes a video hardware device 17 coupled to both the host processor 12 and a video input device 18 which enables video data to be inputted into the computer system 10. Such video input device 18 may include a video camcorder, laser disk player, video recorder and any other similar video devices. A preferred embodiment of the video hardware device 17 is illustrated in FIG. 3 discussed below.

The I/O subsystem 15 may include an I/O bridge 19 as an interface between the I/O bus 20 and the system bus 11 which provides a communication path (i.e., gateway) for the computer system 10 to transfer information to peripheral devices on the I/O bus 20 including, but not limited to a display device 21 (e.g., cathode ray tube, liquid crystal display, etc.) for displaying images; an alphanumeric input device 22 (e.g., an alphanumeric keyboard, etc.) for communicating information and command selections to the host processor 12; a cursor control device 23 (e.g., a mouse, track ball etc.) for controlling WINDOWS™ placement; a mass data storage device 24 (e.g., magnetic tapes, hard disk drive, floppy disk drive, etc.) for storing information and instructions; and a hard copy device 25 (e.g., plotter, printer, etc.) for providing a tangible, visual representation of the information. It is contemplated that the computer system shown in FIG. 2 may employ some or all of these components or different components than those illustrated.

Figure 3:
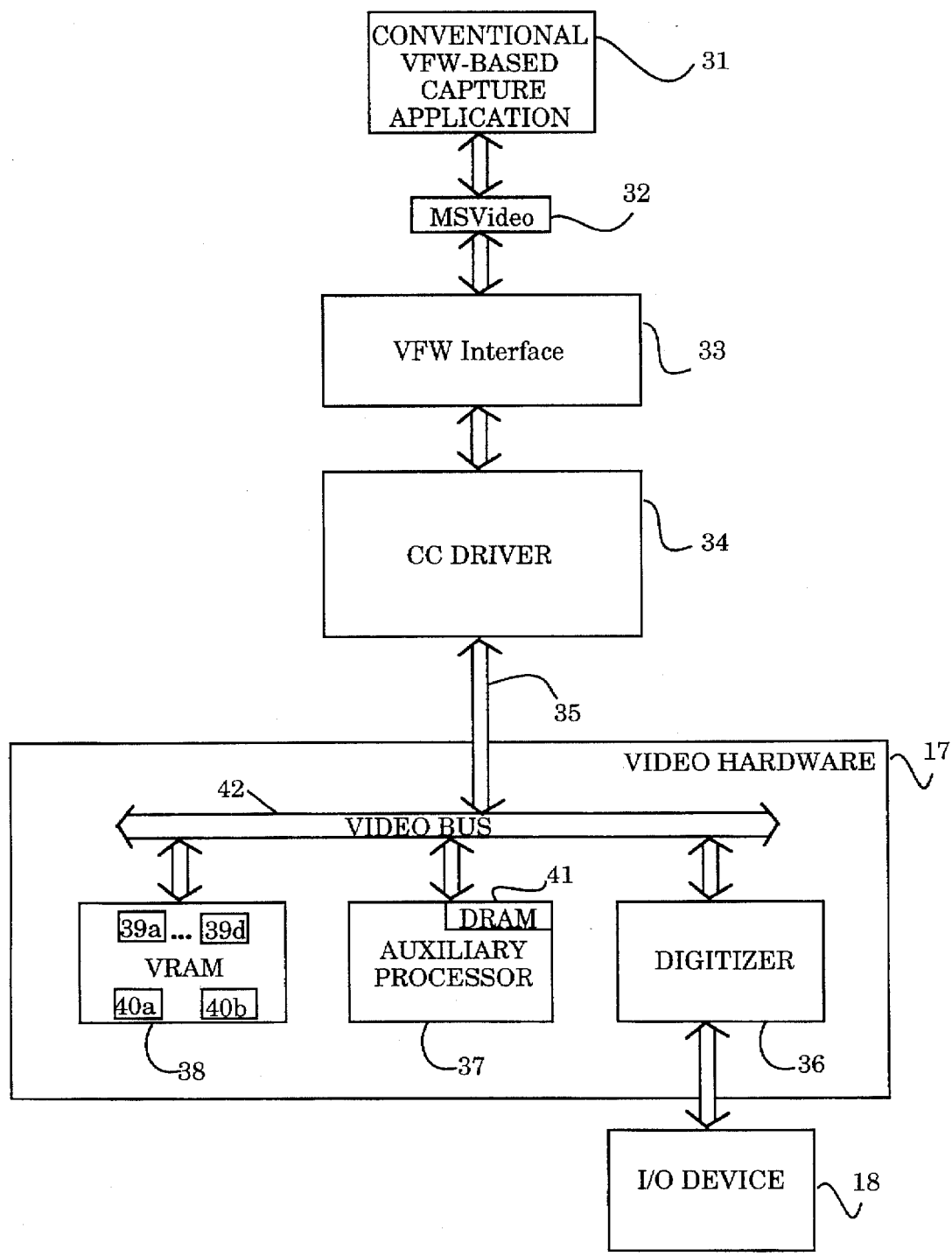
FIG. 3 is a detailed block diagram of a communication path of the capture message call being transmitted within the interactive video computer system employing the capture and compression driver.

Referring to FIG. 3, the propagation of a capture message call through the interactive video computer system 10 of the present invention is illustrated in detail. In order to capture video data, a VFW-based capture application 31 (e.g., a published application entitled VIDCAP™ by MICROSOFT® Corporation), is executed by the host processor to generate a capture message call. The capture message call is transmitted to a library "MSVIDEO™" 32 and then through the VFW interface 33 to a capture and compression driver (hereinafter referred to as the "CC driver") 34.

Monitoring the VFW interface 33 in a periodic or continuous manner, the CC driver 34 receives the capture message call and outputs an appropriate control signal along a bi-directional communication path 35 to the video hardware 17 (e.g., an ACTIONMEDIA™ II card or an INTEL® SMART VIDEO RECORDER™), being coupled to the video input device 18. This communication path 35 is bi-directional to allow the video hardware 17 to return result codes such as error codes, acknowledgment signals, and the like to the VFW-based capture application 31.

As further shown in FIG. 3, the video hardware 17 comprises a digitizer 36 (e.g., an IBM® CS2™), an auxiliary processor 37 such as an INTEL® pixel processor (i750PB™) having dynamic random access memory 41 and video random access memory ("VRAM") 38, coupled together through a video bus 42. These components are provided within the ACTIONMEDIA™ II card or the INTEL® SMART VIDEO RECORDER™ (ISRV™) currently being sold by Intel Corporation. In response to a control signal by the CC driver 34, the digitizer 36 captures the video data from the video input device 18 and stores the captured video data in a first storage element 39a of a plurality of linked-list capture storage elements 39a–39d (e.g., bitmaps, buffers, etc.) located within the VRAM 88. In this embodiment, there exists four (4) linked-list capture storage elements 39a–39d, although any number of capture storage elements may be used, depending on a particular interactive video computer system design. After the first capture storage element 39a is full, the digitzer 36 alternatively stores the captured video data in a successive capture storage element 39b, for example, and proceeds to store the captured video in another capture storage element 39c when the successive capture storage element 39b is full and so on. The digitizer 36 reverts back to the first capture storage element 39a after a last of the capture storage elements 39d is full. Such storage is generally continuous and repetitious in nature.

Figure 6:
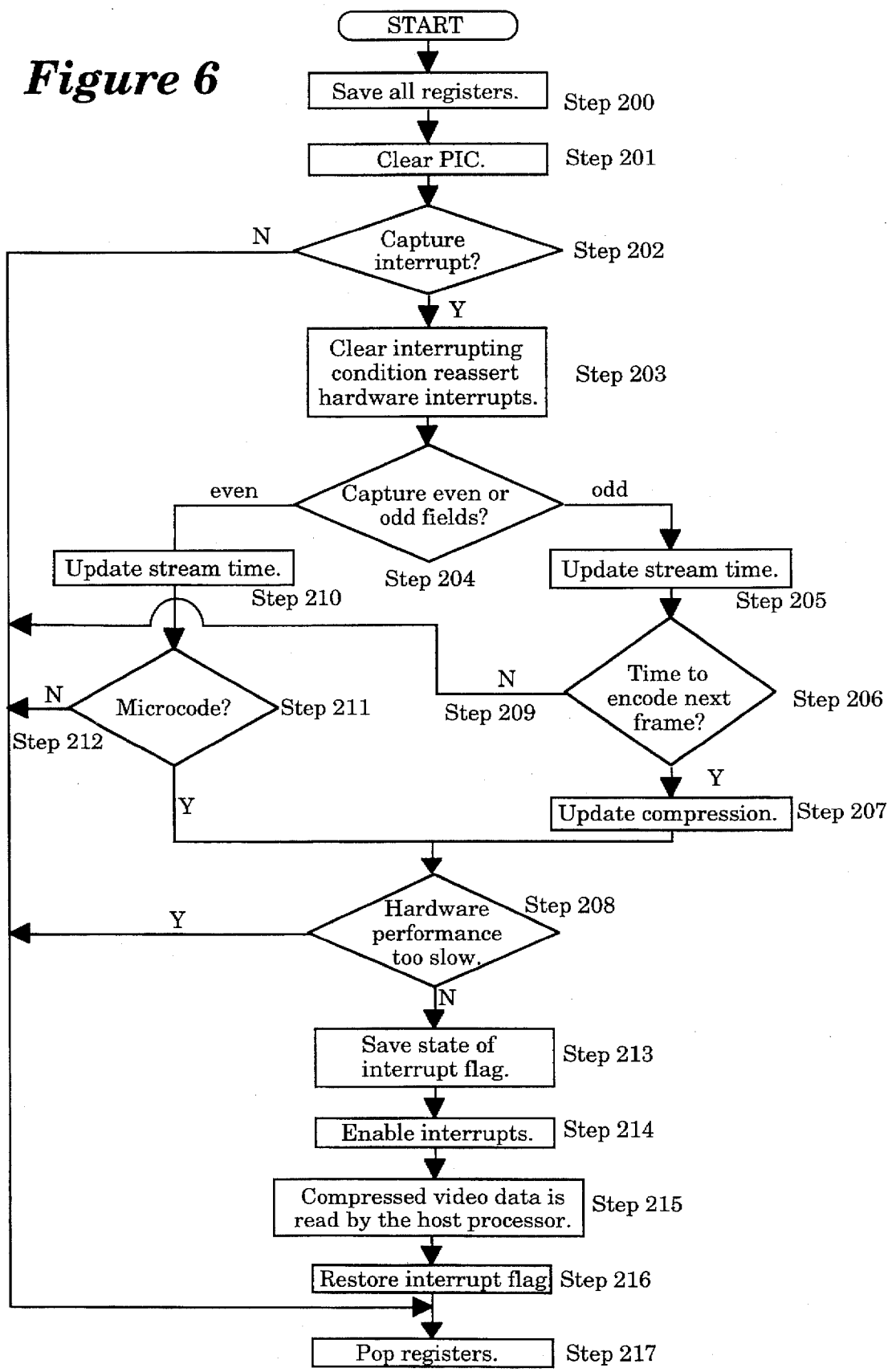
FIG. 6 is a flowchart of the interrupt service routine supporting the handshaking operations illustrated in FIG. 5.

The auxiliary processor 37, in fact the video hardware 17 in general, is controlled by the CC driver 34 in its allocation of storage elements for captured video data as well as compression of the video data through handshaking with the host processor 12. Briefly, in the preferred embodiment, the auxiliary processor 37 compresses the captured video data stored in the plurality of capture storage elements 39a–39d within VRAM 38 upon signaling by the host processor 12 after detection of a capture interrupt as shown in FIG. 6. The auxiliary processor 37 places the resulting compressed video data in one of at least two compression storage elements 40a and 40b in the VRAM 38. These plurality of compression storage elements 40a and 40b are also accessible by the host processor 12.

Figure 4:
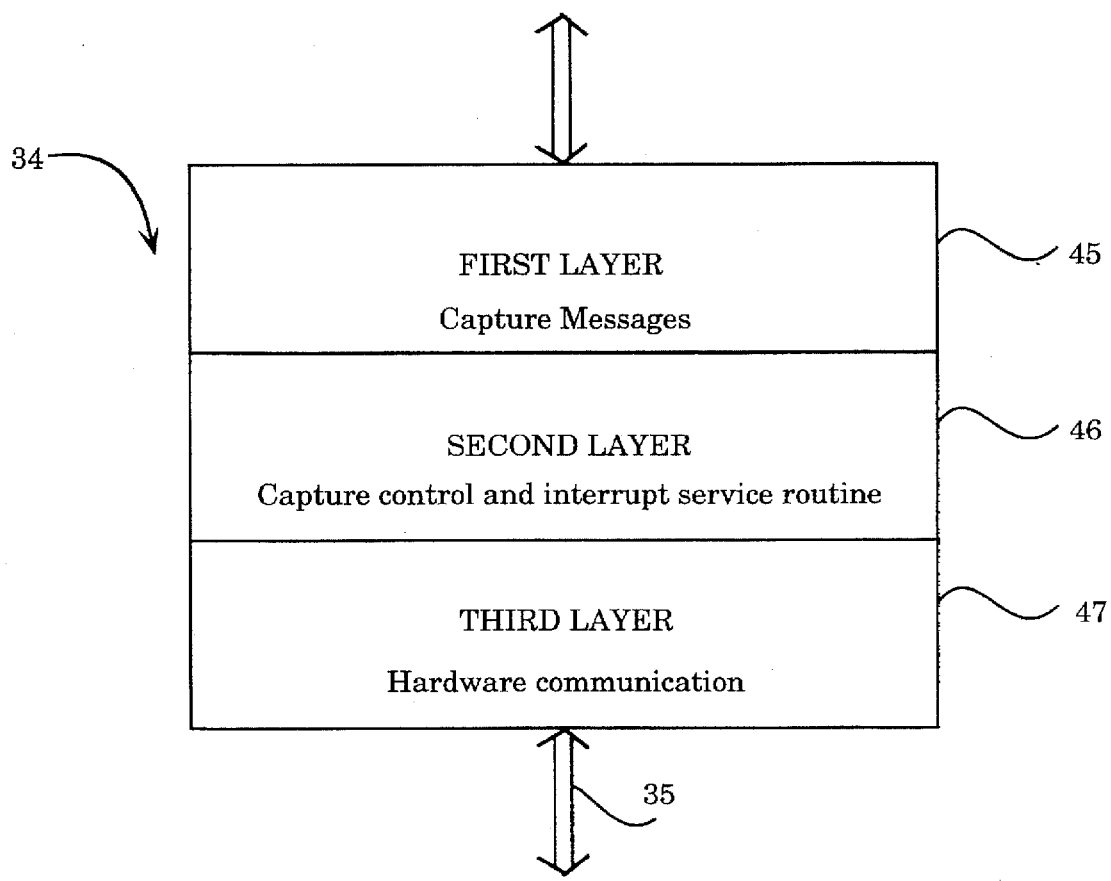
FIG. 4 is a block diagram of the structural organization of the capture and compression driver.

Referring now to FIG. 4, a more-detailed illustration of the CC driver 34 is illustrated. The CC driver 34 is a combination of software programs forming at least three separate layers. A first layer 45 comprises a program responsive to numerous capture message calls from the VFW-based capture application 31, including opening a dialog box (i.e., a control panel, video effects, etc.). Basically, this program is a switch statement initiating procedural calls to various procedures within the second and third layers 46 and 47 of the CC driver 34 and for maintaining and filling the linked-list of capture storage elements 39a–39d used in capturing video data.

A second layer 46 is used to store capture control programs including, but not limited to, an interrupt service routine which is discussed below in more detail. Moreover, the second layer 46 further includes control structures which maintain the capture storage elements 39a–39d where the captured video data is being saved.

A third layer 47 of the CC driver 34 includes those programs needed for the CC driver 34 to directly communicate with the video hardware 17 through control signals corresponding to the capture message calls received from the video capture application 31. These control signals signal the video hardware 17 where to place the captured video data in VRAM 38 and when the auxiliary processor 37 should begin compressing the captured video data.

In the preferred embodiment of the present invention, the CC driver 34 provides stream and frame capture modes under two control methods, namely host processor control having subsampled compression only and auxiliary processor control which uses micro-code for additional compression purposes as illustrated in Table 2 immediately below. In determining which control method to employ, the CC driver 34 needs to ascertain from the capture message call whether the video data (in video image form) to be captured has a height greater than 240 scan lines equivalent to one video field defined by NTSC standards.

TABLE 2

| | AUXILIARY PROCESSOR CONTROLLED | HOST PROCESSOR CONTROLLED |
|---|---|---|
| STREAM | • Digitize every frame of video data and store in VRAM.<br>• Compress the frames of video data at a frame rate set by the user. | • Digitize the video data as fast as possible.<br>• Transfer multiple frames of video data from VRAM at the frame rate. |
| FRAME | • Digitize the video data as fast as possible.<br>• Compress the frame of video data at a frame rate of 30 fps. | • Digitize the video data as fast as possible.<br>• Transfer the video frame only after a capture frame message has been received. |

Referring back to FIG. 3 with reference to Table 2, if the CC driver 34 determines that a capture message call is directed toward video data being a video image less than one video field in size, the capture and compression process is under auxiliary processor control. In this event, if a single video frame is selected to be captured indicating that the VFW-based capture application 31 generated a capture frame message (e.g., "DVM_FRAME"), the CC driver 34 digitizes the video data comprising the single video frame and stores the digitized video data into one of the plurality of capture storage elements 39a–39d. The digitized video data within the capture storage elements 39a–39d is compressed by the auxiliary processor 37 in accordance with a conventional compression algorithm at a frame rate of approximately thirty (30) video frames per second ("fps") although any frame rate supported by the auxiliary processor 37 may be chosen. On the other hand, if the VFW-based capture application 31 initiates a capture stream message (e.g., "DVM_STREAM_INIT") indicating that streaming mode is desired, the CC driver 34 controls the video hardware so that every video frame is captured and stored in the VRAM 38 upon receipt so that compression is accomplished at a frame rate set by the user.

If the CC driver 34 determines that video data to be captured involves a video image larger than a single video frame, the video data is captured in the plurality of capture storage elements 39a–39d and then is transmitted directly to main memory for use by the host processor 12. More specifically, upon detection of the frame capture message from the VFW-based capture application 31, the CC driver 34 signals the digitizer 36 to capture a single video frame of video data. This single video frame is digitized as fast as possible according to the limitations of the digitizer 36 and is stored in one of capture the plurality of storage elements 39a–39d in VRAM 38 to be transmitted to main memory upon indication by the host processor 12. The latency involved is greater than the auxiliary processor controlled operations because the time delay in transmitting the video frame to the host processor greatly increases because no decompression is used. In regards to the streaming method, video frames are copied from VRAM 38 at the frame rate selected by the user, which is, of course, limited by the capability of the digitizer 36.

Figure 5:
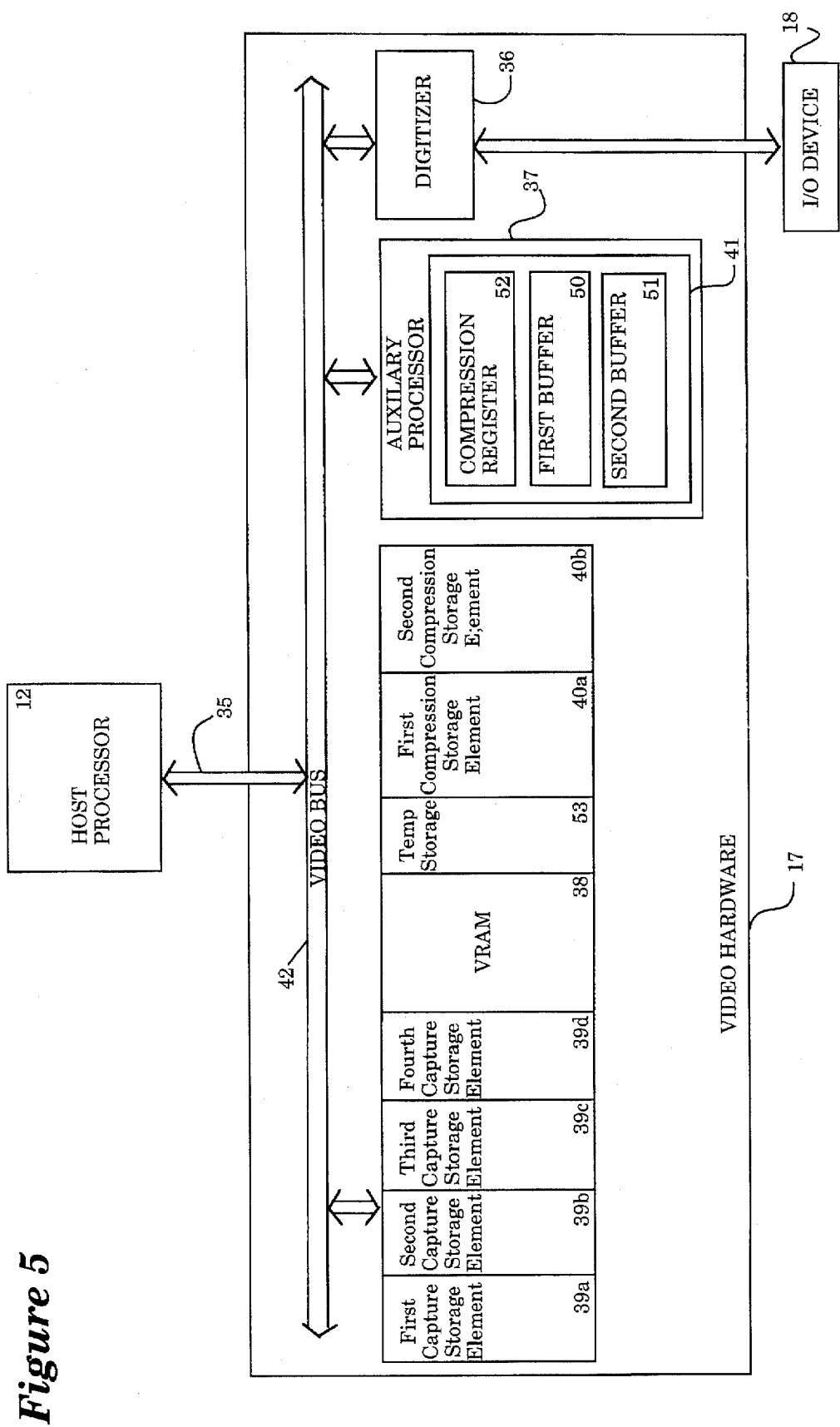
FIG. 5 is a block diagram of the auxiliary and host processors undergoing handshaking operations being controlled by the capture and compression driver.

Referring to FIG. 5, in its preferred embodiment, the CC driver 34 controls capture and compression of video data under auxiliary processor control by employing a handshaking mechanism between the host and auxiliary processors 12 and 37 utilizing a plurality of shared memory locations. In its preferred embodiment, at least three shared handshaking memory locations are used; namely, a first and a second buffer 50 and 51 and a compression register 52 which are stored in DRAM 41 located within the auxiliary processor 37. The compression register 52 is used to signal the auxiliary processor 37 to begin compression of a particular video frame being stored in one of the plurality of capture storage elements 39a–39d according to a predetermined compression algorithm. The first and second buffers 50 and 51 are used as semaphores indicating whether its corresponding compression storage elements 40a and 40b are full or empty. Once compression is complete, the auxiliary processor 37 sets the appropriate buffer 50 or 51, signaling to the host processor 12 that compressed data is ready to be copied to the main memory from VRAM 38.

The CC driver 34 controls the host processor 12 and the auxiliary processor 37 with a handshaking scheme as illustrated by the pseudo code in Table 3 located in the Appendix. The first step in the handshaking scheme is for the auxiliary processor 37 to read a particular value stored in the compression register 52 and to store the particular value within a temporary storage element 53 (e.g., register, buffer, etc.) located within DRAM 41 as shown or any other memory source accessible by the auxiliary processor 37. Thereafter, the auxiliary processor 37 periodically compares the compression register 52 with this temporary storage element 53 to determine if any changes have been made to the compression register by the host processor 12.

Operating concurrently with the auxiliary processor 37, the host processor 12, after being interrupted by the digitizer 36, alters the compression register 52 to signal that the captured video data needs to be compressed. After altering the compression register 52, the host processor 12 periodically and alternatively checks the first and second buffers 50 and 51 to determine which buffer, if any, is active (performs a "callback routine"). An active first buffer 50 indicates that compressed video data unread by the host processor 12 is being stored within the first compression storage element 40a and an active second buffer 51 indicates that compressed video data is within the second compression storage element 40b.

Once the compression register 52 is changed by the host processor 12, the CC driver 84 generates a first control signal to the digitizer 36 to continue sequentially storing video data in any of the remaining plurality of capture storage elements in VRAM 38, for example capture storage elements 39b, 39c or 39d in the event that video data was being captured and stored in a first capture storage element 39a. In addition, the CC driver 34 generates a second control signal to the auxiliary processor 37 to begin compression of the captured video data within the first capture storage element 39a and store the result in a first of the plurality of compression storage elements 40a. Thereafter, the CC driver 34 signals the auxiliary processor 37 to attach a frame header to the compressed video data in order to provide information regarding its video frame size, and the CC driver 34 also sets the first buffer 50 to indicate that the first compression storage elements 40a is full. After setting the first buffer 50, the host processor 12 will then read compressed video data from the first compression storage element 40a and clears the first buffer 50 after completing the read operation. Besides a one-to-one relationship between the first capture and first compression storage elements, it is contemplated that identical handshaking operations as above could occur for any ratio of capture and compression storage elements.

Referring to FIG. 6, a detailed flowchart of the interrupt service routine of the capture and compression driver is illustrated. The interrupt service routine within the CC driver 34 enables the host and auxiliary processors 12 and 37 to operate in a handshaking relationship to capture and compress video data in real time for a streaming mode. In Step 200, the interrupt service routine saves the contents of the internal host processor registers ("register values") in order to temporarily pause the host processor for servicing the interrupt. In Step 201, a programmable interrupt controller is cleared for reasons as known by persons skilled in the art.

In Step 202, the interrupt service routine determines whether the interrupt was a result of a capture interrupt by the digitizer in storing captured video data into VRAM. If the interrupt is not a capture interrupt, then the register values are "popped" (i.e., placed on top of stack memory) and copied back into the internal host-processor registers and the interrupt service routine continues monitoring for another interrupt (Step 217). If the interrupt is a capture interrupt, then the interrupt is cleared and the hardware interrupts are reasserted so as to allow the next interrupt to be received (Step 203).

In step 204, the interrupt service routine then determines whether even or odd fields of the video data are to be capture because the video data comprises sixty interlaced video fields and thirty video fields still provide good picture quality. As a result, a divide-by-two compression can be performed without sacrificing any video quality. When an odd field is encountered, the host processor determines whether a next video frame should be encoded (Step 206) and if so, the host processor updates the compression register to begin compression (Step 207). Thereafter, internal system performance is monitored (Step 208). If it is not time to encode the next video frame, the interrupt service routine is exited (Step 209) and the system continues monitoring for another capture interrupt (Step 217).

When an even field is encountered, the host processor determines whether micro-code is being used indicating video compression is desired (Step 211). If micro-code is not being used, video frames are only read from VRAM on odd fields since the operation is synchronous with the old fields and therefore, the interrupt service routine is exited in a manner similar to step 209 (Step 212). If micro-code is being used, video frames may be read from VRAM during odd or even fields so that the internal system performance is monitored (Step 208). Since, unlike other systems, the capture and compression is accomplished in real time, internal system performance needs to be monitored in the event that the video hardware (e.g., auxiliary processor, digitizer, etc.) is too slow. Thus, the interrupt service routine will exit if the hardware is not fast enough to capture and compress in real time.

If the system performance is sufficient, the state of the interrupt flag is set (Step 213) so that additional processing can occur. Thereafter, the interrupts are enabled to allow parallel operations (Step 214). Next, the compressed video data is read from the host processor (Step 215), interrupt flag is restored to allow signaling no interrupt in process (Step 216) and interrupt service routine is exited (Step 217).

The present invention described herein may be designed in many different embodiments evident to one skilled in the art than those described without departing from the spirit and scope of the present invention. The invention should, therefore be measured in terms of the claims which follow.

APPENDIX A

TABLE 1

MESSAGES FROM THE VIDEO CAPTURE APPLICATION

| | Description |
|---|---|
| Initialization Messages | |
| DRV_LOAD | Load driver |
| DRV_ENABLE | Enable driver |
| DRV_OPEN | Open video channel |
| DRV_GETVIDEOAPIVER | Get API Version being a default |
| DRV_GET_CHANNEL_CAPS | Get channels capabilities |
| DVM_STREAM_INIT | Initializes a stream |
| Customizing The Capture Format | |
| DVM_FORMAT | Video format request |
| DVM_DST_RECT | Get destination rectangle |
| DVM_SRC_RECT | Get source rectangle |
| Exiting the Video Capture Application | |
| DVM_STREAM_FINI | Finishes a stream |
| DRV_CLOSE | Close video channel |
| DRV_DISABLE | Disable driver |
| DRV_FREE | Free driver |
| Capture Stream Mode | |
| DVM_STREAM_ADDBUFFER | Adds a buffer |
| DVM_STREAM_FIN | Finishes a stream |
| DVM_STREAM_GETERROR | Gets error code |
| DVM_STREAM_GETPOSITION | Gets position |
| DVM_STREAM_INIT | Inits stream |
| DVM_STREAM_PREPAREHEADER | Prepares header |
| DVM_STREAM_RESET | Resets stream |
| DVM_STREAM_START | Starts stream |
| DVM_STREAM_STOP | Stops stream |
| DVM_STREAM_UNPREPAREHEADER | Unprepares header |
| Capture Frame Mode | |
| DVM_FRAME | Capture a video frame |

TABLE 3

| Auxiliary Processor | |
|---|---|
| Loop 1: temporary variable = compression register | /* Store contents of the compression register in a temporary variable */ |
| while (compression register == temporary variable) | /* Comparison to determine if there has been any changes to the compression register */ |
| ; | /* Wait until the host processor alters the compression register */ |
| Set digitizer to begin filling next capture storage element | /* Allow digitizer to begin filling another capture storage element since prior one is filled */ |
| while (corresponding data buffer) | /* If the buffer is are set, do not add any more information. */ |
| ; | |
| compress the video frame | /* Begin compression */ |
| add frame header | /* Begin post compression duties */ |
| CC driver sets corresponding data buffer | /* Indicate that the compression storage element corresponding to the data buffer is filled with compressed data */ |
| return to Loop 1; | /* Begin looking for another capture message call needing compression */ |
| Host Processor | |
| if (time to encode next video frame) alter the compression register; | /* If host processor is ready to support compression, alter (i.e., increment or decrement) the compression register */ |
| if (data buffer [0 or 1]) | /* Check whether any of the data buffers are the set */ |
| read data from compression storage element corresponding to the data buffer | /* if a data buffer is set, read contents of its corresponding storage element and clear that data buffer */ |
| clear data buffer [0 or 1] | |

What is claimed is:

1. In an interactive video system comprising a host processor and a driver controlling a video hardware device including an auxiliary processor to capture and compress video data, a method comprising the steps of:
   (a) receiving by the driver the capture message call; and
   (b) determining from the capture message call whether the auxiliary processor is selected to modify the video data, wherein when selected,
      (i) controlling capturing said video data by the driver, and
      (ii) controlling handshaking between the host processor and the auxiliary processor by the driver so that the auxiliary processor compresses the video data generally in real time, the controlling handshaking step includes the steps of
      retrieving the video data from a first storage element, compressing the video data by the auxiliary processor,
      storing the compressed video data by the auxiliary processor in a second storage element accessible by the host processor,
      signaling the host processor that the auxiliary processor has completed compressing the video data, and reading said compressed video data by the host processor from the second storage element.

2. The method according to claim 1, wherein said capturing step comprises the steps of:
   digitizing the video data being inputted into the video hardware device by an input/output device; and
   storing said digitized video data in at least a first storage element.

3. The method according to claim 1, wherein the driver is one of software and hardware.

4. The method according to claim 1, wherein prior to step (i), said determining step further includes the steps of ascertaining size information pertaining to the video data, and selecting the auxiliary processor to modify the video data when the size of video data is less than or equal to one video frame.

5. The method according to claim 1, wherein said step of signaling the host processor includes the step of setting a buffer corresponding to said second storage element by the driver to indicate that said second storage element is storing said compressed video data.

6. The method according to claim 1, wherein prior to said retrieving step, said method further comprises the step of signaling the auxiliary processor to begin compression of the video data.

7. The method according to claim 6, wherein said step of signaling the auxiliary processor to begin compression includes the step of altering a third storage element which is accessible by both the host processor and the auxiliary processor.

8. In an interactive video system comprising a host processor, a video hardware device including an auxiliary processor, and a driver controlling the video hardware device to capture and compress video data in response to a specific capture message call transmitted through a shared software interface from a capture software application, a method comprising the steps of:
   (a) capturing the video data;
   (b) determining whether the auxiliary processor is to be used to compress said video data; and
   (c) controlling a handshaking scheme between the host processor and the auxiliary processor generally in real time with the capturing of the video data when the auxiliary processor is being used, said handshaking scheme includes the steps of:
      (i) signaling the auxiliary processor to begin compression,
      (ii) retrieving the video data from a first storage element,
      (iii) compressing the video data by the auxiliary processor,
      (iv) storing said compressed video data by the auxiliary processor in a second storage element accessible by the host processor,
      (v) signaling the host processor that the auxiliary processor has completed compressing the video data, and
      (vi) reading said compressed video data by the host processor from said second storage element.

9. The method according to claim 8, wherein said capturing step comprises the steps of:
   digitizing the video data being inputted into the video hardware device by an input/output device; and
   storing said digitized video data in at least said first storage element.

10. The method according to claim 8, wherein said determining step includes the steps of ascertaining size information pertaining to the video data, and utilizing the auxiliary processor to compress the video data when the size of video data is less than or equal to one video frame.

11. The method according to claim 8, wherein said step of signaling said auxiliary processor to begin compression includes the step of altering a third storage element which is accessible by both the host processor and the auxiliary processor.

12. The method according to claim 8, wherein said step of signaling the host processor includes the step of setting a buffer corresponding to said second storage element by the driver to indicate that said second storage element is storing said compressed video data.

13. An interactive video computer system comprising:
   a video transceiving device to receive and transmit video data;
   a video hardware device coupled to said video transceiving device, said video hardware device including a digitizer to digitize said video data, an auxiliary processor to compress said video data and a storage device to temporarily store said video data;
   a storage element that contains at least a capture software application;
   a host processor that processes said capture software application and transmits a capture message call;
   a driver that receives said capture message call from said host processor and transmits at least one control signal to said video hardware device in response to said capture message call to perform capture and compression operations generally in real-time, said at least one control signal includes
      (i) a capture control signal to said digitizer to capture said video data and to store said captured video data within a particular address in said storage device, and (ii) a compression control signal to said auxiliary processor to retrieve said captured video data from said particular address in said storage device, to commence compression of said captured video data and to store said compressed video data within a predetermined address in said storage device; and
   a plurality of buses that enables communication between said video transceiving device, said video hardware device, said storage element, said host processor and said driver.

14. Operating in response to a capture message call transmitted by a host processor executing a capture video software application, a driver for controlling capture and compression of video data obtained from an input/output device coupled to a video hardware device including an auxiliary processor, the driver comprising:
   means for generating at least one capture control signal responsive to the capture message call in order to control capturing of the video data; and
   means for generating a plurality of compression control signals to control compression of the video data by the auxiliary processor of the video hardware device generally in real-time with capturing of the video data when the video data is less than or equal to one video frame in size, said plurality of compression control signals including (i) a first compression control signal transmitted to the auxiliary, processor to begin compression of the video data, (ii) a second compression control signal transmitted to the video hardware device to continue storing video data, (iii) a third compression control signal transmitted to the auxiliary processor to begin compression of the video data and to store said compressed video data in a first of a plurality of compression storage elements, said compression is operating concurrently with storing video data, and (iv) a fourth compression control signal transmitted to the auxiliary processor to set a buffer associated with said first of said plurality of compression storage elements to signify to the host processor that said first of said plurality of compression storage elements contains said compressed video data.

15. The driver according to claim 14, wherein said at least one capture control signal is transmitted to a digitizer within the video hardware device requesting said digitizer to digitize the video data and to store said digitized video data into a first storage element of a plurality of linked-list capture storage elements.

* * * * *